April 29, 1924.
W. H. PRIESS
SPEED CONTROLLING APPARATUS
Filed Jan. 31, 1921
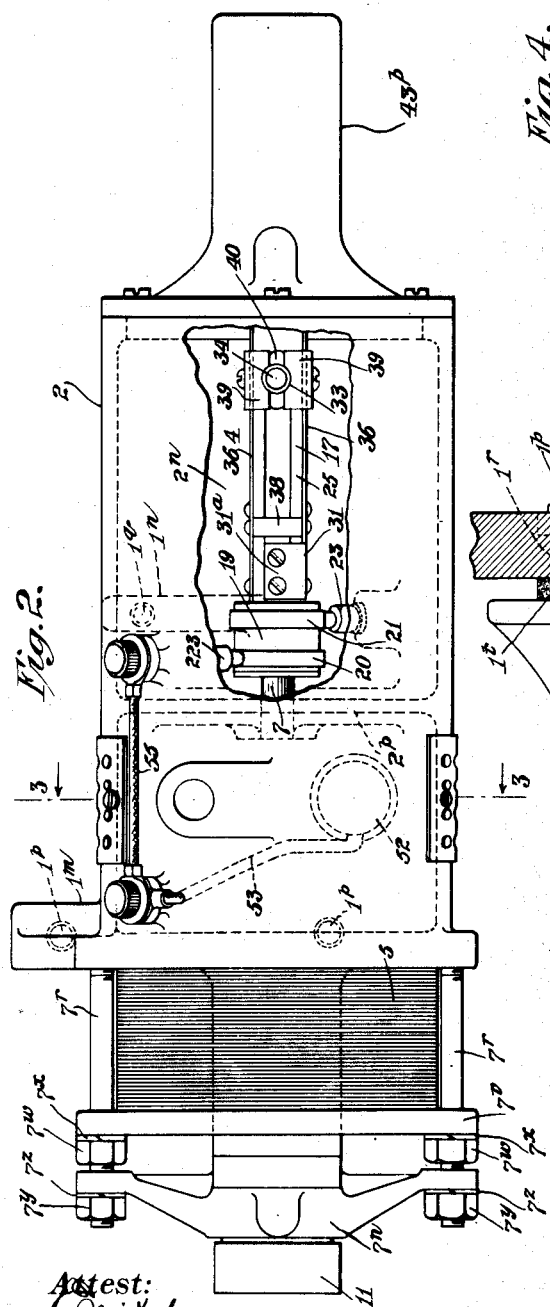
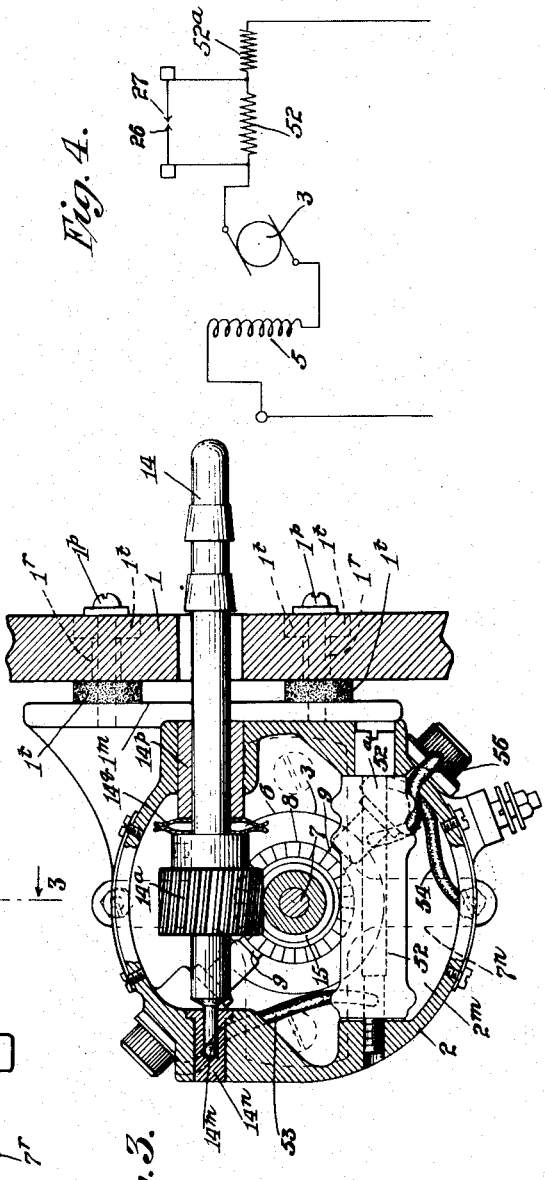
Inventor:
William H. Priess.

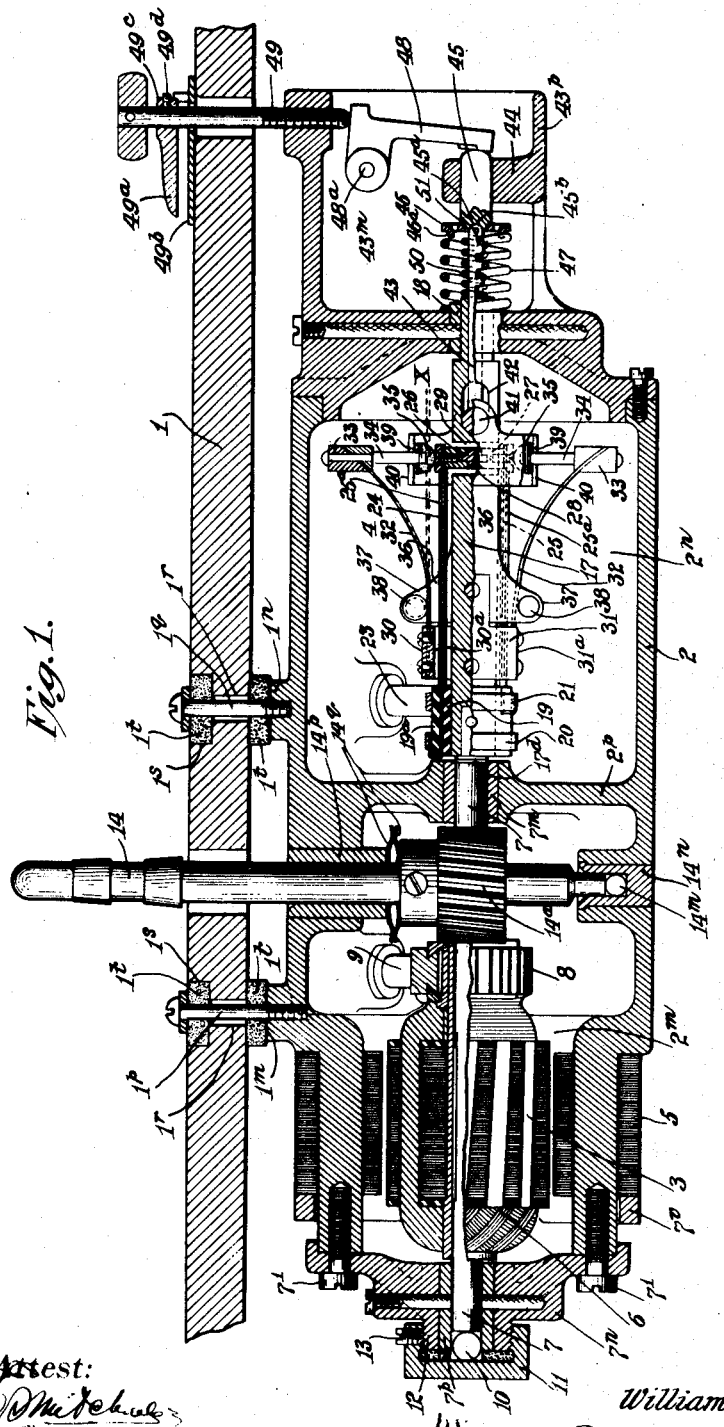

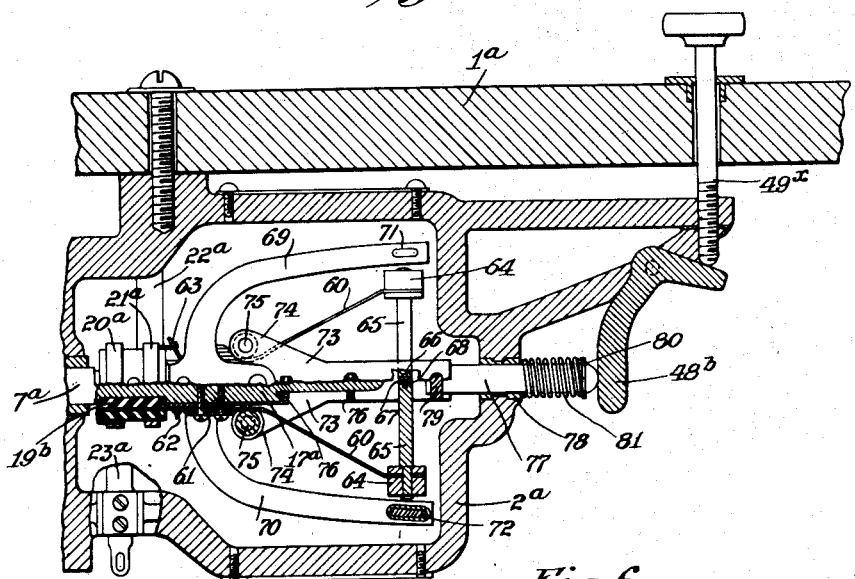

April 29, 1924.

W. H. PRIESS

SPEED CONTROLLING APPARATUS

Filed Jan. 31, 1921   5 Sheets-Sheet 4

Attest:

Inventor:
William H. Priess.
by Philip Farnsworth Atty

April 29, 1924.

W. H. PRIESS

SPEED CONTROLLING APPARATUS

Filed Jan. 31, 1921   5 Sheets-Sheet 5

1,491,883

Attest:

Inventor:
William H. Priess.
by ........... Atty.

Patented Apr. 29, 1924.

1,491,883

UNITED STATES PATENT OFFICE.

WILLIAM H. PRIESS, OF BELMONT, MASSACHUSETTS, ASSIGNOR TO WIRELESS SPECIALTY APPARATUS COMPANY, OF BOSTON, MASSACHUSETTS, A CORPORATION OF NEW YORK.

SPEED-CONTROLLING APPARATUS.

Application filed January 31, 1921. Serial No. 441,188.

*To all whom it may concern:*

Be it known that I, WILLIAM H. PRIESS, a citizen of the United States of America, and a resident of Belmont, State of Massachusetts, have invented certain new and useful Speed-Controlling Apparatus, the principles of which are set forth in the following specification and accompanying drawings, which disclose the form of the invention which I now consider to be the best of the various forms in which the principles of the invention may be embodied.

This invention relates to speed controlling apparatus. It is often desirable in engineering practice to operate equipment at a constant speed. For example, a high frequency alternator for radio telegraphy must be run at almost an exact speed. The alternator set usually consists of a motor mechanically coupled to a generator. The generator is designed to deliver electrical energy at a definite frequency. The frequency bears a direct relation to the speed of the motor. A small percentage change in generated frequency is very serious since the high frequency circuits, in general, operate via some resonance transfer system and only a very small amount of energy is delivered when the generator is out of resonance with the circuits it excites. A change in generated frequency has its further disadvantage in that the receiving station would find it very difficult to follow these changes which are more or less erratic. This is especially the situation when heterodyne systems are employed in reception. It is essential that practically no deviation in frequency of a transmitter take place.

Another important field for constant speed electrical equipment is in the field of sound producing apparatus. In the phonograph art, the pitch is a direct function of the speed. In reproducing a record, it is therefore necessary to maintain the same speed at which that record was produced in order to duplicate the musical tones of the original. A comparatively sudden change in speed during the playing of a record causes a grave distortion in sound which is very objectionable. A further example of musical art requiring a constant speed prime mover is the piano player. In this case, a change in speed causes a change in the time of the record and likewise produces distortion.

Changes of speed in motors follow, in general, changes in applied potential and changes in load. It is well known in the electrical art that the speed of a motor can be changed by altering its applied potential or varying the strength of its field. Several means have been suggested for automatically maintaining the speed constant; for example, a governor consisting of governor balls and retaining springs, acting on a lever system, producing friction against some part of the moving mechanism, has been used to control the speed. A system of this type controls the speed in a very inefficient manner and likewise has only a small degree of control, inasmuch as the coefficient of friction between parts varies with the condition of these parts and with the relative motion and temperature of these parts. For example, there is a large difference in the coefficient of friction, between static, and dynamic friction. There is a large difference in the coefficients of friction of two parts, when both parts are dry and when both parts are lubricated. Furthermore, there is a difference in the coefficients of friction between parts that are hot and parts that are cold. Differences in the coefficients of friction accompany differences in condition of the surfaces of the parts; for example, polished, dull and rough surfaces have different coefficients of friction. It will be appreciated that daily variations, such as moisture, roughening or smoothing of the friction bearing surfaces, etc., cause such a wide variation in the coefficients of friction that this means cannot be used for automatically holding the load and, consequently, the speed, to small limits of variation from a fixed predetermined value under wide voltage variations. A second consideration and cause for failure of the friction governor system lies in the fact that the motor load may likewise vary within wide limits.

Another method in vogue for automatically controlling the speed of a motor has been the use of a governor system with governor balls and springs, one end of the spring being attached to a portion fixed to the governor shaft, the other end of the spring being attached to a table concentric to the governor shaft and sliding on it. The sliding portion is attached mechanically to a contact system. Variations in distance between the fixed end of the spring and the sliding platform are used to separate contacts. The contacts are generally placed either in series with the motor field or in series with the main motor circuit. A condenser or resistance may be used around these contacts. This system has the grave defect that the total friction of the sliding platform on its shaft and the friction of the interconnecting mechanism between the sliding platform and the contacts is greater than the changes in centrifugal forces for the permissible speed variation. Furthermore, it has another serious mechanical defect in that the motion of the platform is but a very small fraction of the radial motion of the governor weights, the motion of the platform being equal to the change of length in the chord of the spring while a motion of the governor weights is the corresponding change in maximum perpendicular distance between the weight and shaft, i. e., for a given motion of the governor balls but a small fraction of this motion is available for the useful purpose of controlling the separation of contacts.

An ideal system of controlling speed of a motor would be by providing an electrical system that would control either the field or the main motor circuits and controlled by a mechanical system that would be frictionless and that would have large relative motions of contacts for very small changes in speed. The system hereinafter described is such a system.

An object of the invention is to provide controlling apparatus which shall be most sensitively responsive to the slightest variations of speed to be controlled.

Another object of the invention is to provide a motor and control system which is practically noiseless and free from vibration.

Another object of the invention is to provide a noiseless universal motor having nearly the same speed on direct or alternating current, any differences of speed being easily controllable by the controlling device associated with it.

The invention consists further in details of construction and combination of parts hereinafter more particularly described and claimed.

In the accompanying drawings,

Figure 1 is a sectional elevation with parts broken away of what I now consider the preferred form of my invention.

Fig. 2 is a bottom plan view of the speed control of Fig. 1 with part of the casing broken away.

Fig. 3 is a sectional elevation of part of the motor and controller casing taken on the line 3—3 of Fig. 2, looking in the direction of the arrows.

Fig. 4 is a wiring diagram showing the electrical connections of the construction of Fig. 1.

Fig. 5 is a sectional elevation illustrating a modified form of control.

Fig. 6 is a sectional view of a further form of speed control illustrating the application thereof for use in steam engines, turbines, and the like.

Figure 7:
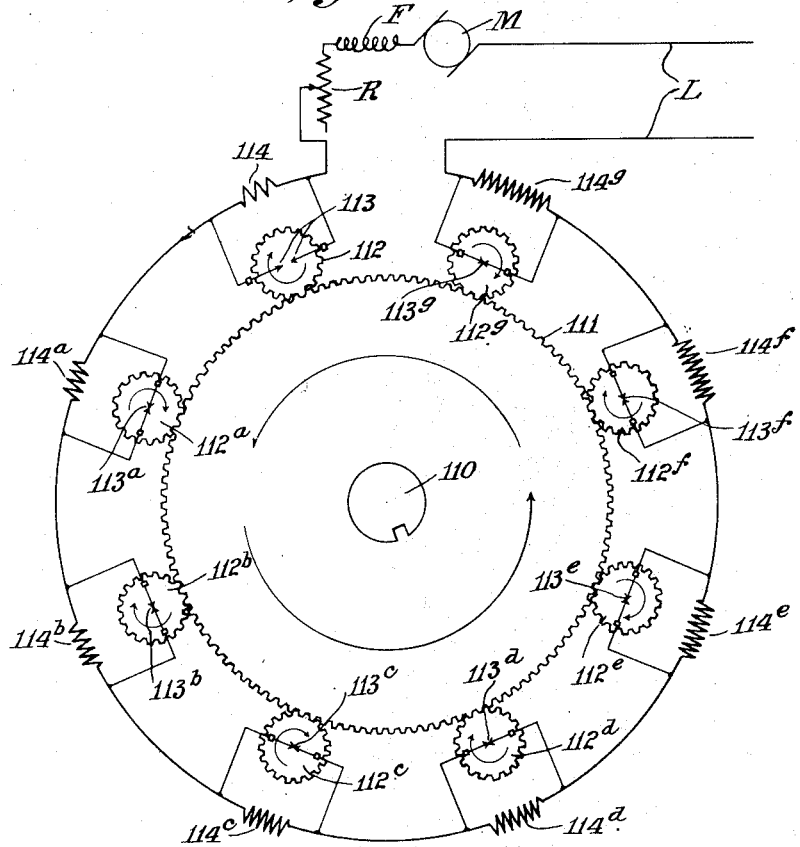
Fig. 7 is a diagrammatic view illustrating one method of application of the speed control of the present invention.

Although the present invention is of general application, yet by way of example I have illustrated what I consider my preferred form, Figs. 1, 2 and 3, as applied to control the speed of a phonograph motor. In this form, to the bottom of a horizontal table 1 of the phonograph is secured casing 2 having in one portion thereof a motor 3 and in another portion thereof a speed control 4.

The phonograph turntable (not shown) is driven by the turntable shaft 14 arranged vertically and adjacent to shaft 7 and at right angles thereto and driven from the motor by a simplified transmission of any desired type. In the embodiment here illustrated, a worm 15 is secured directly on shaft 7 and directly meshes with a spiral gear 14$^a$ secured to shaft 14 by a collar, providing a single set of gears only in the device. The worm 15 is located as close as possible to bearing 7$^m$. This is the point of minimum shaft bending. The worm is mounted on a shaft (7) which is supported at spaced points as already described. Furthermore, worm 15 is connected directly to the motor and not via a gear or coupling. This arrangement eliminates the possibility of play and instantaneous uncontrollable speed variations when the control operates. In a like manner, shaft 14 is supported at its lower end in a bearing 14$^n$ in the casing 2 having a ball bearing 14$^m$ for taking up the end thrust, while the upper end of shaft 14 above gear 14$^n$ is supported and journaled in an extra-long bearing 14$^p$ in casing 2 with gear 14$^a$ as close as possible to this bearing 14ᵖ, which is the point of minimum shaft bending. The gear 14ᵃ is thus supported at points upon opposite sides of it. Interposed between bearing 14ᵖ and gear 14ᵃ are a pair of cup-shaped spring washers 14ᵠ mounted upon shaft 14 and having their concavities facing each other. These washers slide over each other with very little frictional loss, their edges being curved divergently as shown. These washers 14ᵠ maintain a constant load on shaft 14 under varying conditions, and thereby reduce noise and vibration at these points to a minimum. This method of mounting provides a very accurate alinement of gears, and serves to reduce to a minimum gear noises due to any non-alinement.

The speed control 4 is mounted on a square shaft 17 directly secured at one end to the inner end of shaft 7 in alinement therewith and to rotate therewith, thus eliminating transmission gears, and journaled at its opposite end in a bearing 18 within the casing 2. On shaft 7 and between the bearing 7ᵐ and point of connection of shaft 17 to shaft 7 are the oil-deflecting rings 17ᵈ. On a portion of the shaft 17 adjacent to shaft 7 is secured an insulating sleeve 19, having thereon a pair of spaced metal slip rings 20 and 21 surrounding the same, and engaged by suitable brushes 22 and 23 mounted in casing 2 and connected as hereinafter more fully described. A pair of flat metal springs 24 and 25 are each secured at one end to the sleeve 19 by insulating wedges 19ᵃ at diametrically opposite points thereon, one spring being electrically connected to the slip ring 20 and the other spring to the slip ring 21. These springs 24 and 25 extend substantially parallel to each other and parallel with the axis of the shaft 17 interposed between them, and are provided at their free ends with rod contacts or movable parts 26 and 27 of metal, such as tungsten or platinum-iridium or soft metal contacts such as silver for very small currents and voltages, directly mounted thereon, extending inwardly towards and engaging each other at 28, the square shaft 17 having a hole 29 in which the contacts 26 and 27 freely play. The springs 24 and 25, when the contacts 26 and 27 are not compressed towards each other by the centrifugal means hereinafter described, allow the separation of the contacts 26 and 27 out of engagement with each other under centrifugal force acting on the contacts due to rotation of the motor, opening the hereinafter-described line or circuit, the movement of these contacts being in directions at right angles to the shaft 17. The centrifugal force necessary to open the contacts 26 and 27 is very small, as the springs 24 and 25 are not under any appreciable initial tension opposing such force. Sufficient centrifugal force is developed to open the contacts at a very low speed of the motor. The springs 24 and 25 are covered with sheaths of rubber 25ᵃ, which serve to damp sound vibrations produced at the contacts and prevent their transmittal to the frame or casing 2. A pair of angular brackets 30 and 31 are mounted upon and secured to opposite sides of the square shaft 17 adjacent the end near the slip rings. One bracket 30 has a portion 30ᵃ extending over the shaft 17 parallel with the side of the shaft 17, adjacent to the side of attachment of that bracket, and the other bracket 31 in like manner has a portion 31ᵃ extending over the shaft 17 at a side adjacent to its point of attachment but on a side opposite to the side on which the first portion 30ᵃ is located. Fixed by screws to the portions 30ᵃ and 31ᵃ are a pair of steel or cantilever springs 32, normally flat, if under no initial tension as indicated at X in dotted lines in Fig. 1 and each secured to a portion 30ᵃ or 31ᵃ at one end and extending towards the opposite end of the shaft 17 in the same plane in which the springs 24 and 25 are located. The springs 32 may be of steel, phosphor bronze or other elastic metals or alloys.

These cantilever springs 32 are provided at their outer free ends with weights 33 and are placed under initial tension or stress and deflected into the curve shape shown in Fig. 1 by means of spacers or rods 34 attached or fixed at the free ends of the springs to the weights, extending inwardly at right angles to the axis of the shaft 17 and having heads or knobs 35 on their inner ends of felt or other suitable inelastic nonconducting material, noiselessly engaging the contacts 26 and 27 to normally press and maintain them in contacting position closing their circuit. The contacts 26 and 27 are controlled from the springs 32 by the application and release of force thereon, applied from the points of maximum deflection of the spring arms 32. The springs 32 are strong springs of the cantilever type to allow a large deflection for a given change of force. Under the action of centrifugal force, when the motor reaches a given speed, there will be a tendency for the weights 33 to move outwardly as the parts rotate as a whole, causing the spacers 34 to move out of engagement with the contacts 26 and 27, and allowing their circuit to open. Under normal conditions, however, inasmuch as these springs 32 are under initial tension as described, the motor will have to reach a definite speed which can be determined for a given control, or the speed control device can be designed for any speed and can be varied for refinements of adjustments by the means hereinafter described at which contacts 26 and 27 are allowed to separate upon the movement of the weights 33 and their attached spacers 34. By this construction, there is provided a system in which the mechanical parts,—such as the centrifugally-operated weights 33,—and the electrical parts, the contacts 26 and 27, are independently mounted whereby the contacts 26 and 27, having very small angular movements, may flatly, evenly and uniformly engage each other throughout while in contact, although controlled by means having a comparatively great angular movement.

Slidably mounted upon opposite sides of the shaft 17 are a pair of connected plates 36 having ears 37 extending oppositely beyond and outside of the shaft 17 and springs 32, and between which are secured rods 38 engaging the outer portions of the springs 32 substantially as shown in Fig. 1 and constituting the real fulcrum of these springs 32 or the points around which they are flexed or moved when actuated under the influence of centrifugal force. The plates 36 are also provided with stops 39 overlying the contacts 26 and 27 and heads 35, and provided with open-ended slots 40 through which the spacers 34 pass and in which they ride. The stops or members 39 limit the outward movement of the weights 33 by reason of the engagement of the inelastic heads 35 therewith, and tend to dampen the springs 32, preventing them from vibrating at a natural period. Thus the stops 39 co-operating with the inelastic heads 35 constitute a noiseless damping means. The side plates 36 and rods 38 constitute a movable structure whereby the effective length, and hence the pressure exerted on the contacts 26 and 27, is varied by moving the rods 38 one way or the other over the springs 32, thereby increasing or decreasing the centrifugal force necessary to overcome this tension and therefore the speed at which the device operates.

The system of which the side plates 36 and rods 38 are a part is slidably mounted on the shaft 17, and is supported thereon by a cross pin 41 secured to the plates 36 and sliding in a longitudinal slot 42 in the square shaft 17. An actuating pin or rod 43 is secured to the cross pin 41, and slidably extends through shaft 17 and through the bearing 18 and beyond the end of the shaft 17 into a chamber 43$^m$ provided in the end casting 43$^p$ of casing 2. The pin 43 is provided with a semi-spherical end. Slidably mounted in a lug 44 in chamber 43$^m$ is a control rod 45 in alinement with pin 43 and provided with a reduced portion 45$^a$ at its inner end, having a semi-spherical recess 45$^b$ into which the semi-spherical end of pin 43 rotatably fits. Fitted tightly around the reduced portion 45$^a$ is a spring seat 46 having a plurality of lugs 46$^a$ struck up therefrom. Interposed between the seat 46 and the end of casing 2 is a heavy spring 47 retained on the seat by means of the lugs 46$^a$ and bearing 18 and surrounding pin 43, whereby the rod 45 is held against a bell crank lever 48 pivoted at 48$^a$ to the end casting and which in turn presses the lever 48 against an adjusting screw 49 threaded in the end casting and extending above table 1. The pin 43 is held against rod 45 in the recess 45$^b$ by means of a spring 50 interposed between a collar or pin 51 on pin 43 and the end of casing 2. The system described provides a dead centering of rotating parts and eliminates lost motion.

I have thus provided a mechanism for setting the speed at any desired value within the range of this adjustment, by which the motor is controlled while the motor is running. By adjusting the screw 49, the rods 38 are moved along the springs 32 one way or the other, to vary their tension and thus vary the pressure upon the contacts 26 and 27 and hence the speed at which the centrifugal force is sufficient to overcome the tension in the springs 32. The portion of the adjusting screw 49 above table is provided with a pointer 49$^a$ adapted to ride over a graduated segment 49$^b$ mounted on the table to indicate the value of the various adjustments. The pointer 49$^a$ is rotatably adjustable on screw 49, being provided with a collar 49$^c$ on screw 49 and which may be adjustably secured by a set screw 49$^d$, whereby the pointer may be empirically set to a given speed valuation.

The motor of the present invention is of a universal type in which the armature windings are in series with the field windings; that is, it operates on both alternating and direct currents from usual commercial lines which are 110 volt direct current lines or 110 volts, 60 cycles and 25 cycles alternating current lines. The motor is adapted to operate at a constant speed, apparatus subject to varying load and on lines having considerable voltage fluctuations. The means employed in the present example for maintaining this constancy of speed comprises a motor so designed that the speeds of the motor on direct and alternating currents respectively are nearly equal, and which in co-operation with the constant speel control, is capable of maintaining a constant speed under all practical conditions.

For motors of the same impressed voltages and power output, and designed for different speeds, the inductances increase in value with decreases in speed. On very small powers, motors for universal service are usually high speed motors, i. e., between 2,000 and 6,000 R. P. M.

I have found, however, that motors produce noise at a speed of approximately 1,800 R. P. M., the noises increasing as the speed increases above 1,800 R. P. M. Among other things, the noise is due to air currents set up at these speeds, known as windage. This type of noise disappears at about 1,200 R. P. M. It is preferable, therefore, that the motor of the present invention operate at a speed below that which produces windage noises, and in the specific embodiment of Fig. 1 here described the motor operates at a mean speed of approximately 1,100 R. P. M., which is reduced to normal speed for reproducing phonograph records by the transmission mechanism, this speed being approximately 78 R. P. M. in most standard phonographs.

In order to make the inductance low in a motor designed for the above-described speed, and hence maintain the impedance of the motor, either on direct or alternating current, substantially constant, the motor of the present invention is designed to operate on an impressed voltage of less than the 110 volts of the commercial lines; for example, a voltage of approximately 50 volts more or less, thus decreasing the number of turns of wire in the field and armature necessary for a given speed and reducing by a substantial amount the inductance, and consequently the reactance, on alternating currents. The resistance of the motor circuit should be and is of the same order of magnitude as the reactance, or greater. The reactance of the motor circuit should never exceed the resistance of the motor circuit in value. The difference between the impressed voltage of the motor and the line voltage is absorbed in a resistance 52$^a$, Fig. 4, in series with the motor windings and constituting part of the resistance of the motor circuit above referred to. The resistance 52$^a$ is of such value that, when the contacts 26 and 27 are closed and the line fluctuates to its lowest voltage, the motor will deliver its full voltage with a safety factor at required speed. The resistance 52, controlled by contacts 26 and 27, is of such a value that the sum of the resistances 52 and 52$^a$ in series with the motor will permit the motor to run at the highest value of line voltage fluctuation at no load and proper speed when the contacts 26 and 27 are open. In the service for which the motor of this invention is designed, the user often stops the rotating phonograph table by holding it with the hand while the voltage is impressed across the motor, which results in heating in the motor circuit. This heating in the present invention, however, occurs mainly in the resistance 52$^a$, which is external to the motor windings, thus preventing excessive heating in the motor windings, which heating might otherwise burn out the motor. If the motor were of the usual design, i. e., had a low resistance winding, and did not have an external resistance 52$^a$ in series with it on the line, the current through the windings of the motor would burn the latter out, under the ill-treatment above mentioned. The resistances 52 and 52$^a$ are wound on a common porcelain tube, see Fig. 3, and, after the leads are brought out, encased in or coated with a vitreous enamel to make a compact and unitary structure.

The contacts 26 and 27 may control any suitable circuit which controls the speed of the motor. There are several methods of doing this as above mentioned. In the specific construction illustrated in Fig. 1, the resistances 52 and 52$^a$, as shown in Figs. 2 and 3 and diagrammatically in Fig. 4, are mounted within the casing in parallel relation to the phonograph shaft 14 and between the motor and speed control. Conductor 53 connects one end of the resistances 52 and 52$^a$ to one of the commutator brushes 9 and a conductor 54 connects the other end of the resistances 52 and 52$^a$ to a terminal to the line, the resistances 52 and 52$^a$ being connected, as shown diagrammatically in Fig. 4, in series with the field and armature of the motor. As shown in Fig. 2, the brush 9 is electrically connected to the slip ring brush 22 by a conductor 55, while a conductor 56, Fig. 3, connects the resistance 52 between that resistance and resistance 52$^a$ to the slip ring brush 23. The other commutator brush 9 is connected to the line through the field as shown in Fig. 4. When the contacts 26 and 27 are closed, the resistance 52 is short-circuited, and when the contacts open, the resistance 52 is thrown in series with the field and motor armature to cause the slowing down of the motor. The resistance when in series with the motor circuit causes a drop in the terminal voltage across the motor and consequently causes it to slow down. This decreases the centrifugal force of the weights. As soon as the centrifugal force decreases to such a value that it is less than the spring force, the contacts again close. The frequency of repetition, as well as the relative times of closed contact and open contact, depend upon the conditions of line voltage and load for a given motor. By using a free-ended spring fixed at one end, such as shown in Fig. 1, a very large flexing is obtained for a small change in force and therefore, for a given opening of contacts necessary to alter the circuit, the speed change is small. By providing a system of two springs and two weights, the opening is doubled for the same change of speed and the system is balanced against gravity. In designing the springs 32, it is desirable to employ a fairly strong spring with as large an initial deflection as can be safely used without carrying the springs to or beyond their elastic limit.

The mechanical arrangement shown in Figs. 1 and 2 is desirable inasmuch as it provides a two-bearing support for shaft 17 of the system and in addition has the feature of maintaining a plane meeting of the contacts 26 and 27 which is independent of the change in angle of the ends of the springs 32 resulting from change in speed setting.

The speed-controlling apparatus is designed in any case for a given mean desired speed of the motor to be controlled, or adjustments may be provided as described herein for the purpose of setting the controlling apparatus to hold the motor at any other desired speed within the range of the design. The operation is such that the speed which would be maintained more or less constant by the motor independently of the speed control at the mean line voltage and load is higher than the speed at which it is desired to keep the motor; and therefore, when the motor is in operation and begins to exceed the desired speed, then the contacts separate, opening the motor circuit. This maintains the speed of the motor practically constant by reducing the torque. Again, when the tendency is to slow down too much, the contacts close, again short-circuiting the resistance 52 of the motor circuit in ample time to prevent any too great reduction of speed. Thereafter, the slightest increase of motor speed causes the contacts to be opened. The inertia of the rotating parts is sufficient to smooth out all tendencies of the control device to cause instantaneous appreciable variations of speed and maintains the speed uniform. In practice, this apparatus has proved most efficient on account of the exceedingly quick action of opening and closing the circuit, such rapidity being due to the initial tension of the spring arms 32, their low natural period and their duplicate arrangement to operate the contacts, and by reason of the absence of frictional losses. By such means, the contacts 26 and 27 are moved to a distance which is ample to open them, and, of greater importance, this is effected in an exceedingly short time. The dampers 39 bring the system of the spring arms 32 to rest against centrifugal force before they reach the end of their natural swing.

Frictional losses are substantially eliminated in this apparatus, as all movements are bending movements in elastic springs. There is a total absence of sliding or rolling friction.

The position of the dampers 39 is predetermined by the designer to permit a sufficient swing of the spring arms 32 to adequately open the circuit. This interferes with the natural oscillations of the spring arms, not only preventing too great a movement thereof, but, by preventing their full swing, damping the same.

The weights are of such value and so located, i. e., spaced a sufficient distance from the axis of shaft 17, as to develop the desired centrifugal force to overcome the tension of the spring arms when the speed exceeds the desired value. The lengths of the spacing rods 34 for initially flexing the spring arms 32 are so designed that the springs are permanently and properly flexed in installation as indicated by comparison of the full line and dotted line positions of Fig. 1. The pressure of the contacts 26 and 27 on one another when the apparatus is not in operation is predetermined and depends on the length, thickness, width and material of the spring arms, and upon their initial deflection, which in turn is dependent upon the length of the spacing rods 34 and upon the position of the supports to which the springs 32 are secured. Preferably, the spring arms are fixed near the line of the axis of shaft 17, which is in line with the contacting position of the contacts 26 and 27, the spring arms being flat springs and given their normal deflection by the spacing rods 34, all for the purpose of holding contacts 26 and 27 in their contacting positions; although there is nothing inherent in the invention which forbids the employment of a spring member co-operating with a centrifugal arm to force it toward the contact-closing position opposing the effective centrifugal force.

When the speed of rotation of shaft 17 is such that the centrifugal force tending to move the spring arms 32, which are fixed to shaft 17 and rotate therewith, away from their contact-closing position, balances the force tending to move the arms towards their contact-closing position, then there is no pressure on the contacts 26 and 27. A very slight increase of rotation of shaft 17 will then cause full separation of the contacts controlling the motor circuit. This applies to the full line position shown in Fig. 1. It applies analogously to a condition when, the motor having speeded up, the heads 35 are in engagement with the damping means 39, when a very slight reduction of the speed of rotation of shaft 17, producing a correspondingly slight decrease in the centrifugal force, will permit the spring forces acting on the spring arms to press the contacts together.

In the embodiment disclosed in Fig. 1, there are employed two co-operating spring arms 32 and two co-operating movable contacts. This arrangement not only doubles the amplitude of contact separation in a given instant for a given increase of motor speed, but also it permits the use of the apparatus in any position, for the reason that the use of two such spring arms balancing against one another as shown has the effect of neutralizing or balancing out the effect of gravity, as they both tend to move with the contacts in the same direction under the influence of gravity maintaining the contact or vice versa.

In the construction herein described and as disclosed in Fig. 1, the contacts are at rest relatively to each other and are opened (or closed) only when the speed of the motor reaches a value such that the centrifugal force exceeds the initial spring force. The contacts remain open (or closed) and at rest relatively to each other when the bumpers or dampers are used, until the speed of the motor reaches a value such that the centrifugal force is less than the spring force, when the contacts close (or open). In some cases, the contacts would be moved once in several revolutions or might open several times in one revolution, depending upon conditions of load and voltage variation. For example, if there were very little load and little friction in the moving parts of the motor, and the motor reached this critical value of speed, the contacts would open (or close). Since, in this case, there is very little load and very little friction, there are but small forces tending to slow down the motor. The motor, conceivably, in this case, might make one or two revolutions before the windage and other small frictional forces, such as the bearings and brush frictions, might cause the necessary reduction in speed to close (or open) the contacts. In the constructions of the present invention, there is very little, if any, free vibratory movement of the spring arms, but the latter are controlled by an opposition of forces, i. e., their inherent elasticity and centrifugal force.

The motor and control of the present invention is one in which vibration and noise are reduced to a minimum by reducing to a minimum the number of relatively movable parts and providing suitable cushioning, damping and alining means. In addition, all parts, the motor and control, are enclosed, being contained in a casing which reduces noise and provides a compact and unitary structure which includes casing, motor, governor, gear system and resistance unit.

In Fig. 5 is illustrated a modified form of control which is of the same general character as that of the control of Fig. 1. In this form, there is a suitable casing $2^a$, secured to a part $1^a$ of a phonograph and in which is journaled a shaft $7^a$ driven from the motor and terminating within the casing in a square portion $17^a$ on which is mounted the speed control mechanism. This speed control, like the control of Fig. 1, comprises an insulating sleeve $19^b$ surrounding shaft $17^a$ near shaft $7^a$ and on which are mounted the spaced metal slip rings $20^a$ and $21^a$ engaged by brushes $22^a$ and $23^a$ mounted in the casing and in a controlling circuit. A pair of metal spring arms 60, insulated from the square shaft $17^a$, are each connected at one end 61 to the shaft $17^a$ by any suitable means such as the screws shown. The springs 60 are of the cantilever type; that is, each is secured at one end and free to move at its opposite end as in the form described in connection with Fig. 1. One spring arm 60 is electrically connected to the slip ring $20^a$ by means of an electrical connection 62, and the other spring arm 60 is connected to the slip ring $21^a$ by means of connection 63. The outer free ends of the spring arms 60 are provided with centrifugal weights 64 as in the form previously described. Attached to the weights 64 and extending inwardly towards each other in the plane of the shaft $17^a$ are metal spacing rods 65 terminating in contacts 66 and 67 which engage each other at 68 beyond the end of shaft $17^a$. The spacers 65 are of such length that the spring arms 60 are placed under initial tension or stress by being spread out at their free ends by them as shown, holding the contacts 66 and 67 together at 68 under pressure. The springs 60 when under no tension would be flat and extend substantially parallel with the axis of the shaft $17^a$ as shown at X in Fig. 1. The construction of Fig. 5 differs from that of Fig. 1, in that the contacts 66 and 67, instead of being mounted independently of the arms 60, are directly mounted on the arms; that is to say, upon the adjacent ends of the spacers 65, which are in turn connected to the arms 60, the spacers and spring arms forming part of the electrical controlling circuit. Secured to opposite sides of the shaft $17^a$ are two parallel U-shaped members 69 and 70, the arms of which extend outwardly towards and outside of the weights 64. The adjacent ends of the members 69 and 70 are connected by bars constituting stops or damping means 71 and 72, arranged in the path of movement of the weights 64. These stops or damping means 71 and 72 may be composed of any suitable damping and noise-deadening material, such as felt, and limit the outward movement of the arms 60 with their weights 64 when moved by centrifugal force. The construction and general operation of the spring control of Fig. 5 is otherwise the same as that of the spring control of Fig. 1, and needs no further elaboration.

Mounted on opposite sides of the shaft $17^a$ are two parallel plates 73, having oppositely-extending ears 74 in which are fixed cross pins 75 of suitable insulating material engaging the outer sides of the spring arms 60 adjacent their points of connection 61. The plates 73 and pins 75 constitute a unitary structure which is slidably mounted upon the shaft $17^a$ and is suitably guided thereon by means of drilled cross pieces 76 connecting plates 73 and having holes therein whereby they are slidably mounted on the shaft $17^a$, and whereby the pins 75 may be moved over the spring arms to vary the tension thereof by varying their effective length. Suitable means for actuating the members 73 is provided, which consists of an actuating pin 77 slidably mounted in bearing 78 of the casing and swiveled at its inner end in a cross piece 79 connecting the two members or plates 73. The outer end of the pin 77 is provided with a collar 80 between which and the casing is a surrounding coil spring 81, which tends to hold the pin in outward position against the bell crank lever 48$^b$, which is actuated by the screw 49$^x$ as in the construction of Fig. 1. The construction of the speed-setting means of Fig. 5 is substantially like that of the setting means of Fig. 1, whereby, upon the adjustment of the screw 49$^x$, the pins 75 will move along the arms 60 varying their effective length, and hence increasing or decreasing the tension exerted upon the contacts 66 and 67 and increasing or decreasing the speed at which the spring arms will operate to open or close the contacts. The contacts 66 and 67 may be in series in a circuit which, through the slip rings 20$^a$ and 21$^a$, controls a motor circuit in any way desired to regulate the speed thereof such as by the means illustrated in Fig. 4.

The mechanical principle employed in governing electrical equipment may be used in the construction of a governor for controlling the speed of motors or prime movers of other types, such as steam engines, turbines and internal combustion engines. A steam engine can be arranged so that a motion of the governor weights would operate a valve in the main steam line. The setting would be such that, at normal speed, a full valve opening would be had, and that, at a higher speed, a governor would operate to close the opening. A similar mechanical system would be used in the case of turbines. In the case of internal combustion engines, control of the butterfly valve leading off from the mixture chamber of the carbureter might be used, or, in addition, a mechanical connection between the governor system and the timing of the spark so that, when a speed above normal is reached, a motion of the governing system would operate to cut down the supply of mixture and at the same time retard the timing of the ignition system.

Referring to Fig. 6, I have illustrated an embodiment of the invention as applied or adapted for use in such last-mentioned forms of motors or prime movers. In this figure, the line 90 may represent the main line or an auxiliary portion of the main line of any of these devices. This line 90 comprises in part a rotatable shaft or tube 91 having a passage 92 therethrough, which passage 92 is continued at opposite ends by passages 93 in the fixed frame 94. The shaft 91 has suitable bearings 95 in the frame 94 and suitable packing for joints may be here inserted in any well-known manner. The rotatable tube 91 is provided with an enlarged diaphragm valve casing 96 in which is mounted co-operating movable valve members for controlling the line 90. These co-operating members comprise a cylindrical member 97 having a passage 98 therethrough aligned with line 90 and a stem 99 projecting through and slidably mounted in the casing 96. The other member of this valve mechanism comprises a stem 100, telescoping in the cylindrical member 97 and having a passage 101 therethrough registering with the passage 98 in the co-operating valve member and with the line 90. The stem 100 projects through and is slidably mounted in the valve casing 96. The passage 90 where it enters the valve casing 96 is flared as indicated at 96$^a$ to allow the valve members 97 and 100 to move together under the influence of gravity without closing the valve. The outer end of the stem 99 is provided with a centrifugal weight 102, while the outer end of the member 100 is likewise provided with a centrifugal weight 103. A pair of springs or spring arms 104 of the cantilever type such as illustrated in Figs. 1 and 5 are each secured at one end 105 to the rotatable shaft 91 near one end of the latter, and are slidably secured at their outer ends to the members 99 and 100 by means of pin and slot connections 106. The points of connection of the spring arms 104 to the members 99 and 100 are so located that the arms are placed under initial tension or stress when connected to the members 99 and 100, and tend to move the valve members 99 and 100 inwardly towards each other to the position shown in the drawing. When the shaft 91 is rotated by means of a suitable transmission mechanism 107, which is connected to the source of power which is to be controlled, if the speed exceeds certain limits as determined by the tension of the springs 104, the weights 102 and 103 will move outwardly, moving the members 99 and 100 relative to each other, closing the valve in the passage 90. As soon as the speed of the prime mover, such as a turbine or steam engine, decreases, the valve will again open allowing free passage of the fluid or vapor therethrough. In assembling constructions such as shown in Fig. 6, the casting, which includes the rotating parts, will, of course, be split on the valve axis to permit assembly of the valve. The governor disclosed in Fig. 6 controls the passage of steam, water or gas vapor mixture through the passage 90.

In Fig. 7 is illustrated one of the applications to which speed controls such as the type described herein may be applied. This figure illustrates the application of a plurality of speed controls for the purpose of controlling the speed of motors of higher powers by a step-by-step variation of resistance in series with the main circuit of the motor. This is a use of speed controls which is especially adapted for the regulation of the speed of radio frequency alternators in which the field of the motor is in series with the motor circuit, both field and armature. The idea is to have a plurality of speed controls, adjusted to operate successively to close or open circuits at successively-increasing speeds, so that, as the motor exceeds the desired speed, the controls will successively close or open their circuits to add or subtract resistances to or from the motor circuit.

By the way of example in Fig. 7, there is provided a shaft 110 driven by motor M and having fixed thereto a gear 111. With gear 111 mesh a series of gears 112 and 112 *a–g* spaced therearound. The gears 112 and 112 *a–g* have mounted thereon or on parts rotating therewith speed controls such as disclosed in Figs. 1 and 4 and indicated diagrammatically in Fig. 7 by means of the arrows which represent the movable contacts of the controls and are marked 113 and 113 *a–g*. In the diagram of Fig. 7, the motor armature M is in series with the field F and a rheostat R. In series with the field and armature are the resistances 114 and 114 *a–g*, each controlled by one of the controls 113, 113 *a–g*. These resistances as shown have successively-increasing values. As long as the motor speed is normal, the contacts of the several speed controls 113 and 113 *a–g* will be closed, short-circuiting the several resistances 114 and 114 *a–g*. Should the speed of the motor exceed the desired value, the contacts of the several speed controls will open successively; for instance, as indicated by the separated arrows of the speed control 113, throwing in series with the field and motor the resistance 114. Should this not sufficiently retard the motor, at the next increment of speed the contacts of the speed control 113ª will open, throwing the additional resistance 114ª in series with the field and motor and the resistance 114, and so on, until the speed has been retarded to normal or desired speed. In like manner, the contacts then successively close as the speed tends to slow down too much.

In a practical embodiment of the invention disclosed in Fig. 7, the several speed controllers 113 and 113 *a–g* may be adjusted to open successively as the speed increases, or vice versa; for example, to maintain one hundred (100) R. P. M., the speed control contacts 113 might open at 100 R. P. M., the next succeeding speed control might open at 100.1 R. P. M., and the succeeding speed control might be arranged to have its contacts open at 100.2 R. P. M., and so on. The several resistances 114 and 114 *a–g* grade upward in such fashion that each contact for that resistance handles its safe voltage.

Figure 8:
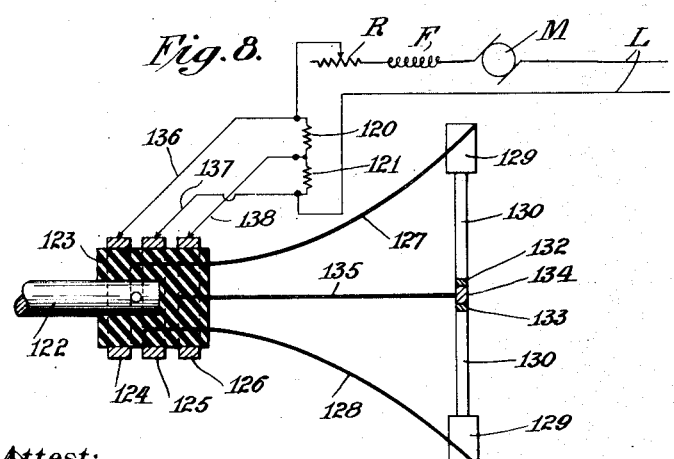
Fig. 8 is a view with parts omitted and more or less diagrammatic, illustrating a still further form of my invention.

In Fig. 8 is illustrated a form of control in which there are two resistance variations and multiple contacts. The purpose of this arrangement is to provide a control capable of handling greater voltages than can be handled by a single contact. In this figure, the motor armature M and field F are in series with each other in the line L. A rheostat R may likewise be in series with the field F and armature M. A resistance in two parts in series, 120 and 121, is in series with the motor and field. In this embodiment, a shaft 122, which is driven from the motor M, is provided with an insulating mounting 123 on which are spaced metal slip rings 124, 125 and 126. A pair of spring arms 127 and 128 of the cantilever type are secured to the member 123 and are of the same general type as already described in connection with Figs. 1 and 5. These spring arms are each attached at one end to the member 123, and are provided at their outer ends with weights 129, which are held in spaced-apart relation by the spacers 130 extending inwardly towards each other, and are provided with contacts 132 and 133 at their inner ends engaging contact 134 on the free end of a centrally-located flat metal spring 135 secured at its opposite end to the member 123. The spring 135 is electrically connected to the slip ring 126, the spring 127 electrically connected to the slip ring 124, and the spring 128 electrically connected to the slip ring 125. The slip ring 124 is connected by a suitable conductor or brush 136 to the outer end of the resistance 120. The slip ring 125 is electrically connected by means of a conductor or brush 137 to the opposite end of the resistances 120 and 121. The slip ring 126 to which the central contact 135 is connected is electrically connected by a conductor or brush 138 to a point between the resistances 120 and 121. It will be seen that the spring arms 127 and 128, with their spacers 131, function as in the forms already described, and the contacts 132, 133 and 134 are normally in contact with each other until the centrifugal force is such as to cause the weights 129 to move outwardly. If the contacts 132 and 134 separate, the part 120 of the resistance which previously had been short-circuited is thrown in series with the motor armature and field to cause the slowing down of the motor, and if the contacts 133 and 134 should separate, the resistance 121 which previously had been short-circuited is thrown in series with the motor. In some cases, both sets of contacts 132 and 133 and 134 will be separated, causing both resistances 120 and 121 to be thrown in series with the field. The speed-setting mechanism described in connection with Figs. 1 and 5 may be applied to this form.

Figure 9:
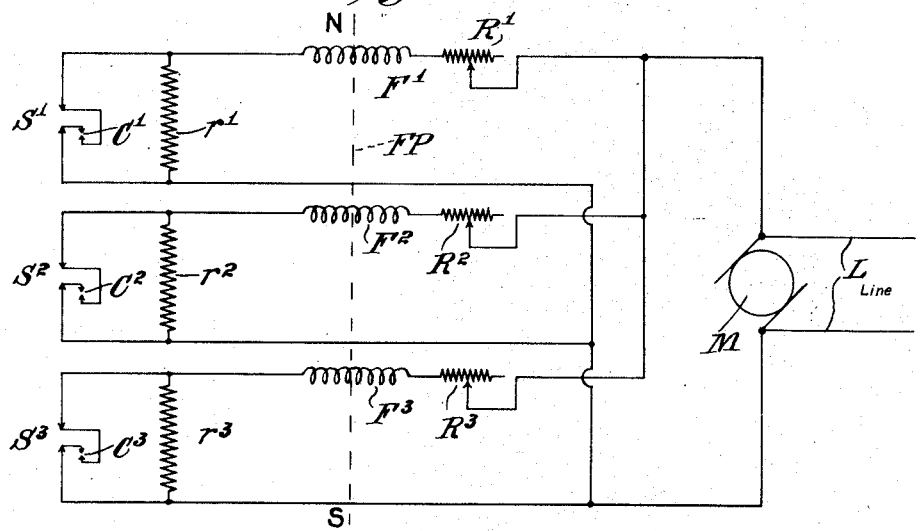
Fig. 9 is a diagrammatic view showing still another application of the present invention.

In Fig. 9, I have illustrated another system, which I now consider the preferred form, for controlling the speed of motors of higher powers, for example, motors for driving radio frequency alternators, by the variation of the field resistance in the motor by means of a plurality of speed controls. In this figure, the contacts of the speed controls are arranged so that they are normally open, but close successively as the motor exceeds the required speed. The closing of the contacts short-circuits or cuts out resistance from the field circuit, which in turn increases the field strength and has the effect of slowing down the speed of the motor.

Figure 10:
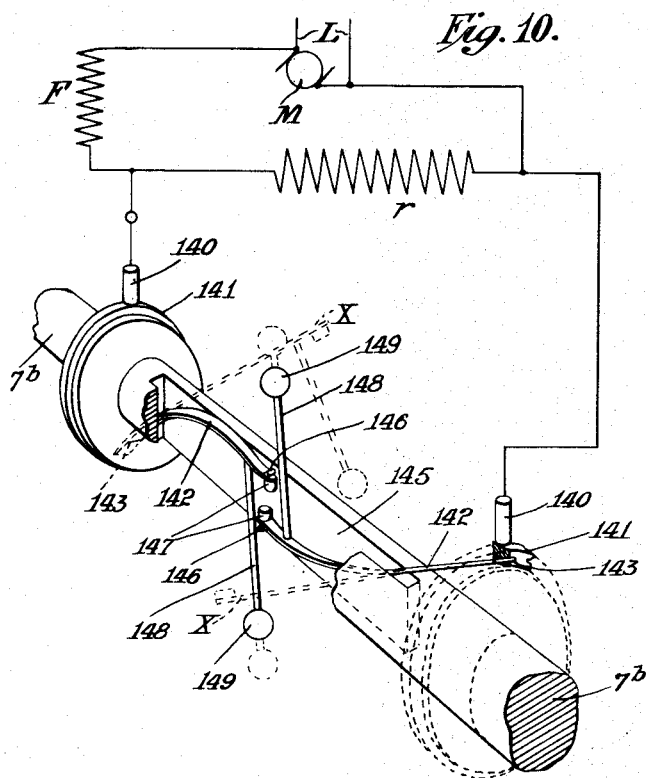
Fig. 10 is a perspective view, with parts broken away and omitted, and also partly diagrammatic, illustrating a further form of the invention.

In Fig. 10, I have illustrated an embodiment of the speed control of the invention adapted for use in connection with a system such as illustrated in Fig. 9. Referring to Fig. 9, the motor armature M is across the line L. Co-operating with the motor armature is a plurality of field windings such as the field $F^1$, $F^2$, $F^3$, in parallel with each other and as here illustrated, and preferably, in parallel with the armature. The three field windings are wound on common field poles FP, that is, all the fields are wound on the same pole pieces. In series with the field are the rheostats $R^1$, $R^2$, $R^3$. In series with the parallel field $F^1$ is a resistance $r^1$. In series with the parallel field $F^2$ is a resistance $r^2$. In series with the field $F^3$ is a resistance $r^3$. The resistances $r^1$ to $r^3$ are of the same value, or they could be of different values; that is, progressively of increasing value. Likewise the fields $F^1$ to $F^3$ are of the same value, although they could be of different values such as progressively increasing values. Shunted around each resistance $r^1$, $r^2$, $r^3$, is a circuit in which a speed control of the present invention, such as the control of Fig. 10, is inserted as indicated diagrammatically at $S^1$, $S^2$, $S^3$. The speed controls $S^1$, $S^2$, $S^3$ are driven from motor M by any suitable transmission means such as that illustrated in Fig. 7. These speed controls comprise the contacts $C^1$, $C^2$, $C^3$, and these contacts are so set and adjusted that they will close successively, first $C^1$, then $C^2$, then $C^3$. As the speed of the motor M increases beyond the desired value, the contacts $C^1$ will close first, short-circuiting the resistance $r^1$ and thus increasing the strength of the field $F^1$ causing the motor to slow down. If this regulation is not sufficient, the contacts $C^2$ will close, short-circuiting the resistance $r^2$, increasing the strength of the field $F^2$, causing the motor to still further slow down, and so on.

In Fig. 10, the motor armature is indicated at M, the field at F (which is in parallel with the motor armature). A resistance $r$ is in series with field F and is adapted to be short-circuited through a circuit comprising the brushes 140 which engage metal slip rings 141 fixed to the rotatable shaft $7^b$ of insulating material, which is rotated and actuated from the motor M. The slip rings 141 are mounted in spaced-apart relation upon the shaft $7^b$. Extending inwardly towards each other between the slip rings 141 are two steel springs or spring arms 142 of the cantilever type which are the spring arms of the present invention. These spring arms are each attached at its outer end at the point 143 to one of the slip rings as shown, and are insulated from shaft $7^b$. The spring arms 142 extend inwardly toward each other and, when untensioned, assume the position shown in dotted lines X X. In order to properly position the spring arms 142 between the slip rings, the shaft $7^b$ is slotted at 145 between the slip rings, through which slot one spring arm 142 extends inwardly and downwardly, and the other extends inwardly and upwardly, when untensioned. Intermediate the slip rings 141 within the slot 145 are two spaced stops or pins 146. In the assembling of the device, the spring arms 142 are pressed inwardly towards each other with their adjacent ends engaging and retained by the pins 146, substantially as shown, under tension. At the adjacent free ends of the spring arms 142, on adjacent sides thereof, are two contacts 147. These contacts, when engaging each other, complete a circuit, short-circuiting the resistance $r$, through the spring arms 142, slip rings and brushes. Two rods 148 are secured to the adjacent free ends of the springs 142, extend through the slot 145 in opposite directions, and are provided at their outer ends with weights 149, the rods being so arranged on the free ends of the springs and projecting in opposite directions in such manner that, as the centrifugal force increases, the rods will move oppositely, bringing the contacts 147 together. The form of the invention disclosed in Fig. 10 is especially adapted for use in circuits as disclosed in Figs. 9 and 10, in which the field is in parallel with the armature of the motor. In the embodiment of Fig. 10, the contacts 147 are normally open and, as the centrifugal force increases, the contacts close. The principles and mode of operation of the construction of Fig. 10 are otherwise substantially the same as those described in connection with Fig. 1.

It is to be understood that the invention is not limited to the embodiments and features specifically shown and described herein, but that such embodiments and features are subject to changes and modifications without any departure from the spirit of the invention.

I claim:—

1. In a speed control for a motor, a rotatable member driven from said motor and a speed control device mounted on said member and comprising means controlling a line controlling the speed of said motor and having co-acting parts both movable relatively to each other in opposite directions to control said line and centrifugally operated members, each directly co-operating with one of said movable parts for controlling the movement thereof.

2. In a speed control for a motor, a rotatable member driven from said motor and a speed control device mounted on said member and comprising means having relatively movable parts to control a line controlling the speed of said motor, centrifugally operated means directly controlling the relative movement of said parts and damping means in the path of movement of said centrifugally-operated means for damping the same.

3. In a speed control for a motor, a rotatable member driven from said motor and a speed control device mounted on said member and comprising means having relatively movable parts for controlling the line of said motor, an elastic centrifugally-operated member having a weight and a relatively long spacer for tensioning said centrifugal member without exceeding its elastic limits and interposed between said weight and said movable parts whereby the latter are directly controlled by said centrifugal member.

4. In a speed control for a motor, a rotatable member driven from said motor, and a speed control device mounted on said member and comprising a pair of centrifugally-operated members and a pair of contacts each directly controlled by one of said centrifugally-operated members, said contacts being in series in a circuit controlling said motor.

5. In a speed control for a motor, a fixed frame, a rotatable member thereon driven from said motor, means mounted on said rotatable member for controlling the speed of the motor and comprising a centrifugally-operated spring arm under stress, and a stress-adjusting device comprising a member slidable on said rotatable member and engaging said spring arm to vary the effective length thereof, and an actuating member engaging said slidable member and mounted on said fixed frame.

6. In a speed control for a motor, a rotatable member driven from said motor, a speed control device mounted on said member and comprising a pair of parts movable together under the influence of gravity and oppositely transversely of the axis of the rotatable member to control the line of said motor, and a pair of centrifugally-operated members for controlling the said opposite movement of said parts.

7. In a speed control for a motor, a rotatable member driven from said motor, a speed control mounted on said rotatable member and comprising parts movable together under the influence of gravity and oppositely transversely of the axis of the rotatable member to control the line of said motor, a pair of centrifugally-operated members arranged on opposite sides of said parts, and a pair of spacers arranged transversely of said axis between said centrifugally-operated members and said parts for initially tensioning said centrifugally-operated members and controlling said parts by said centrifugal members.

8. In a speed control for a motor, a rotatable member driven from said motor and a speed control device mounted on said member and comprising a pair of movable parts controlling a line controlling said motor, a pair of centrifugally-operated members under stress controlling said parts, and a stress-adjusting device for setting the stress of said centrifugal members and thus the speed at which the parts operate.

9. In a speed control for a motor, a rotatable member driven from said motor and a speed control device mounted on said rotatable member and comprising a pair of contacts spring-mounted for movement relatively to each other to control a circuit controlling the speed of the motor, and a centrifugally-operated member mounted independently of said contacts and engageable therewith to control said circuit.

10. In a speed control for a motor, a rotatable member driven from said motor, a speed control device mounted on said rotatable member and comprising a pair of spring-mounted contacts, mounted for movement into and out of engagement with each other to control a circuit controlling the speed of the motor, and a pair of centrifugally-operated members mounted upon opposite sides of said contacts and engageable therewith to control said circuit.

11. In a speed control for a motor, a rotatable member driven from said motor and a speed control device mounted on said member, and comprising a pair of contacts mounted for movement relative to each other to control a circuit and a pair of spring arms, each secured at one end to said rotatable member and extending longitudinally thereof, and means interposed between said spring arms and said contacts, whereby the spring arms are tensioned and said contacts are controlled by said spring arms.

12. In a speed control for a motor, a fixed frame, a rotatable member mounted on said frame and driven from said motor, and a speed control device mounted on said rotatable member and comprising a pair of slip rings mounted adjacent one end of the rotatable member and electrically connected through brushes to a circuit controlling the motor, a pair of spring-mounted contacts mounted for movement relative to each other to control said circuit and electrically connected to said slip rings, a pair of centrifugally-operated spring arms, each secured at one end adjacent said slip rings and extending longitudinally of the rotatable member to positions overlying said contacts, means interposed between the free ends of said spring arms and said contacts for tensioning the former and whereby the operation of said spring arms controls said contacts, damping means interposed in the paths of movement of said spring arms for damping the same, means slidably mounted upon said rotatable member and engaging said spring arms for varying the effective length thereof and thus the extent of tensioning, and actuating means mounted on the fixed frame and engaging said slidable means for actuating the latter.

13. In a speed control for a motor, a fixed frame, a rotatable member driven from said motor and a speed control device mounted on said member and comprising a pair of movable parts controlling a line controlling said motor, a pair of centrifugally-operated spring arms each connected at one end to said rotatable member and extending longitudinally of the rotatable member under tension and engageable with said parts for controlling the same, and a tension-adjusting device slidably mounted on said rotatable member and engaging said spring arms for varying the effective length thereof and thus the tension and actuating means mounted on said fixed frame for moving said tension-adjusting device while the control is in operation.

14. In a speed control for a motor, a rotatable member driven from said motor and a speed control device mounted on said member and comprising means controlling a line controlling the speed of said motor and having co-acting parts both movable oppositely relative to each other to control said line, and a pair of centrifugally-operated spring arms each secured at one end to said rotatable member and extending longitudinally thereof under tension and each directly co-operating with one of said movable parts for controlling the movement thereof.

15. In a speed control for a motor, a rotatable member driven from said motor and a speed control device mounted on said member and comprising means having relatively movable parts to control a line controlling the speed of said motor, a centrifugally-operated spring arm secured at one end to said rotatable member and extending longitudinally of said rotatable member under tension and directly controlling the relative movement of said parts, and damping means in the path of movement of said centrifugally-operated spring arm for damping the same.

16. In a speed control for a motor, a rotatable member driven from said motor and a speed control device mounted on said member and comprising means having parts both movable oppositely relative to each other to control a line controlling the speed of the motor and centrifugally-operated spring arms under tension directly controlling the movement of said parts and each connected at one end to said rotatable member and extending longitudinally thereof and having outer free ends engageable with said relatively movable parts for controlling the same.

17. In a speed control for a motor, a rotatable member driven from said motor, a speed control device mounted on said member and comprising a pair of parts movable together under the influence of gravity and oppositely transversely of the axis of the rotating member to control a line of said motor, and a pair of centrifugally-operated spring arms under tension for controlling the opposite movement of said parts, each arm being secured at one end to said rotatable member and extending longitudinally of said rotatable member with free ends overlying said movable parts and engageable therewith for controlling the same.

18. In a speed control for a motor, a rotatable member driven from said motor, a speed control device mounted on said rotatable member and comprising parts movable together under the influence of gravity and oppositely transversely of the axis of the rotatable member to control a line of said motor, a pair of centrifugally-operated spring arms arranged on opposite sides of said parts, each connected at one end to said rotatable member and extending longitudinally thereof with free ends overlying said parts, a pair of spacers arranged transversely of said axis between the free ends of said spring arms and said parts for initially tensioning said spring arms and controlling said parts by said spring arms.

19. In a speed control for a motor, a rotatable member driven from said motor and a speed control device mounted on said member and comprising means having relatively movable parts controlling a line controlling the speed of said motor, a spring arm secured at one end to said rotatable member and extending longitudinally thereof and provided at its free end with a weight and and a relatively long spacer for tensioning said spring arm without exceeding its elastic limits and interposed between said weight and said movable parts whereby the latter are directly controlled by said spring arm.

20. In a speed control for a motor, a rotatable member driven from said motor and a speed control device mounted on said member and comprising a pair of spring arms, each secured at one end to said rotatable member and extending longitudinally of said rotatable member, and a pair of contacts each directly controlled by one of said centrifugally-operated members, said contacts being in series in a circuit controlling said motor.

21. In a speed control for a motor, a fixed frame, a rotatable member thereon driven from said motor, and a speed control device mounted on said member and comprising relatively-movable centrifugal spring arms and contacts to control the speed of the motor, a member slidably mounted on said rotatable member and engaging said spring arms, a pin connected to said slidable member, arranged axially of said rotatable member and projecting beyond an end of the same, a centering member slidably mounted upon said fixed frame in alinement with said pin, and provided with a recess to receive the end of said pin, a lever engaging one end of said centering pin, an adjusting screw operating against said lever, a spring interposed between the fixed frame and said centering member for maintaining the centering member in engagement with the lever, and a spring for maintaining said axially-arranged pin in engagement with the centering member.

22. In a speed control for a motor, a rotatable member driven from said motor and a speed control device mounted on said member and comprising a pair of relatively-movable contacts, a centrifugally-operated spring arm, a spacer connected to said spring arm and interposed between said spring arm and said contacts and terminating in a head of shock-absorbing and insulating material engaging said contacts, and a stop in the path of movement of said centrifugal arm and said head for limiting the outward movement of said centrifugal arm for damping the same by the engagement of said head of shock-absorbing material therewith.

23. In a speed control for a motor, a rotatable member driven from said motor, and a speed control device mounted on said member and comprising a pair of relatively-movable contacts and centrifugally-operated members controlling the same, and stops limiting the outward movement of said centrifugally-operated members and damping the same.

24. In a speed control for a motor, a rotatable member driven from said motor and a speed control device mounted on said member and comprising a pair of centrifugally-controlled contacts mounted on spring arms and sheaths of inelastic material enclosing said spring arms for preventing vibration thereof and the transference of sound to the rotatable member.

25. In a speed control for a motor, a fixed frame, a rotatable member driven from the motor and mounted on said frame, a pair of slip rings mounted on said member in spaced-apart relation to each other and insulated from the member, a pair of spring arms secured at ends adjacent to the slip rings and electrically-connected thereto, extending longitudinally of the rotatable member and terminating in contacts movable together and oppositely transversely of the rotatable member, a pair of spring arms each secured at one end to the rotatable member and both extending longitudinally of the rotatable member upon opposite sides of said contacts and terminating at their free ends in weights, a pair of spacers secured to said weights and extending inwardly towards each other transversely of the axis of the rotatable member and terminating in heads of shock-absorbing material engaging said contacts, said spacers placing said spring arms under initial tension, stops arranged between said heads and weights for limiting the outward movement of the spring arms and damping the same, means slidably mounted upon said rotatable member and engaging said spring arms whereby the effective length thereof may be varied to increase or decrease the tension thereon for regulating the speed at which the contacts open, and means on the fixed frame for controlling said slidable means.

WILLIAM H. PRIESS.